US011976699B2

(12) United States Patent
Huff

(10) Patent No.: US 11,976,699 B2
(45) Date of Patent: May 7, 2024

(54) ACCESS CONTROL SYSTEM

(71) Applicant: INTEGRATED DESIGN LIMITED, Middlesex (GB)

(72) Inventor: Derek Huff, Middlesex (GB)

(73) Assignee: INTEGRATED DESIGN LIMITED, Middlesex (GB)

( * ) Notice: Subject to any disclaimer, the term of this patent is extended or adjusted under 35 U.S.C. 154(b) by 0 days.

(21) Appl. No.: 17/694,989

(22) Filed: Mar. 15, 2022

(65) Prior Publication Data

US 2022/0298844 A1 Sep. 22, 2022

(30) Foreign Application Priority Data

Mar. 18, 2021 (GB) ..................... 2103784

(51) Int. Cl.
*F16D 63/00* (2006.01)
*E05F 15/627* (2015.01)
(Continued)

(52) U.S. Cl.
CPC .......... *F16D 63/002* (2013.01); *E05F 15/627* (2015.01); *E05F 15/76* (2015.01);
(Continued)

(58) Field of Classification Search
CPC .......... E05F 15/76; F16D 63/002; G07C 9/22
See application file for complete search history.

(56) References Cited

U.S. PATENT DOCUMENTS 4,186,521 A * 2/1980 Hunter ................ E05F 15/79
49/366
6,125,586 A * 10/2000 Buscher .............. F16H 1/28
49/352

(Continued)

FOREIGN PATENT DOCUMENTS

CN 108086891 A 5/2018
DE 102016209191.3 A1 12/2016
(Continued)

OTHER PUBLICATIONS

Great Britain Patent Application No. GB2103784.1, Search Report dated Dec. 20, 2021, 5 pages.

*Primary Examiner* — Gregory J Strimbu
(74) *Attorney, Agent, or Firm* — Leber IP Law; Celia H. Leber

(57) ABSTRACT

An access control system for restricting access through a passageway includes a shaft rotatable about a central axis; a barrier fixed to the shaft to rotate therewith; and a brake assembly. The brake assembly includes a sun gear rotatable about the central axis, a carrier, and a ring gear, wherein one of the carrier or the ring gear is fixed against rotation and the other of the carrier or ring gear is connected to the shaft to rotate therewith. A plurality of planet gears are rotatably connected to the carrier, each planet gear being disposed between and engaging with each of the sun gear and the ring gear. An electromagnetic brake comprises an electromagnet and an armature. The armature is connected to or integral with the sun gear to rotate and move axially therewith. At least one of the electromagnet or the armature is moveable between an operative position and an inoperative position.

13 Claims, 5 Drawing Sheets

(51) Int. Cl.
*E05F 15/76* (2015.01)
*G07C 9/22* (2020.01)
*G08B 21/18* (2006.01)
*F16D 121/20* (2012.01)

(52) U.S. Cl.
CPC ............... *G07C 9/22* (2020.01); *G08B 21/18* (2013.01); *E05Y 2201/21* (2013.01); *E05Y 2201/434* (2013.01); *E05Y 2201/668* (2013.01); *E05Y 2201/72* (2013.01); *E05Y 2400/20* (2013.01); *E05Y 2400/40* (2013.01); *E05Y 2400/856* (2013.01); *E05Y 2800/10* (2013.01); *E05Y 2900/40* (2013.01); *F16D 2121/20* (2013.01)

(56) References Cited

U.S. PATENT DOCUMENTS

| | | | | |
|---|---|---|---|---|
| 6,460,295 | B1* | 10/2002 | Johnson | E05F 15/603 49/360 |
| 2006/0156630 | A1* | 7/2006 | Yokomori | E05F 15/646 49/352 |
| 2013/0120108 | A1* | 5/2013 | Kocznar | E05F 15/76 49/31 |
| 2020/0165856 | A1* | 5/2020 | Scheuring | F16H 1/46 |
| 2021/0293293 | A1* | 9/2021 | Krause | F16K 31/04 |

FOREIGN PATENT DOCUMENTS

| | | |
|---|---|---|
| WO | WO 2012/168223 | * 12/2012 |
| WO | 2014/169886 A1 | 10/2014 |
| WO | WO 2015/020168 | * 2/2015 |

\* cited by examiner

ACCESS CONTROL SYSTEM

RELATED APPLICATION

This application claims priority from Great Britain Patent Application No. 2103784.1, filed Mar. 18, 2021, the entire disclosure of which is incorporated herein by reference.

TECHNICAL FIELD

The present invention relates to access control systems for preventing or restricting the movement of people through a passageway.

BACKGROUND

Access control systems are commonly used to control the passage of people into and/or out of buildings or other restricted environments. Typically, such systems will be deployed within a passageway through which people must pass and will commonly comprise a barrier which extends across the passageway to block the passageway, such that a person cannot pass through the passageway unless and until the barrier has been removed. The barrier may be of any form such as an arm, a panel or a door.

It is common for the movement of such barriers to be controlled by means of a rotatable shaft to which the barrier is attached, such that rotation of the shaft causes concurrent movement of the barrier out of the passageway in order to permit access. The shaft is subsequently rotated in the reverse direction to move the barrier back into its original position extending across the passageway. It is important that a brake is used to prevent rotation of the shaft when the barrier is deployed, in order to prevent the barrier from being forced open by an unauthorised person. The torque applied to the shaft when the barrier is forced will depend on the magnitude of the force and the perpendicular distance between the rotational axis of the shaft and the point on the barrier at which the force is applied, meaning that the torque of the shaft can be significant. Accordingly, the braking torque required of the brake to prevent the barrier from being forced open must also be significant.

Electromechanical shaft brakes comprise a moving magnetic component referred to as an armature, which, when drawn by magnetic force to engage with a corresponding surface of an electromagnet, provides braking torque to an attached torque load. The armature is typically a rotating circular magnetic metal component or 'rotor' and the electromagnet is fixed against rotation.

In one known variation, the rotating circular magnetic component has a number of (often very many) angled teeth which can be made to locate in similar teeth on a corresponding surface of the static electromagnet, thus providing a locking function. The angle of the tooth face is such that a torque load may not hold the teeth locked if the magnetic field is removed. There is an undesirable cost implication to the precision required to engineer this kind of brake. Additionally, the teeth have the effect of indexing the locked position of the brake, which may result in misalignment of the barrier when in the locked state.

In known electromechanical shaft brakes, the braking torque that can be achieved with given materials and magnetising force is a function of the diameter (and thus the length of the moment arm) of the engaging surfaces of the armature and electromagnet body. Therefore, in order to increase the braking torque of the brake, it is necessary to increase the overall dimensions of the brake. However, in applications such as access control systems, there is also a need to provide brakes which are small in size according to the space constraints of the particular application. For example, when trying to create access control systems with slim side walls, where the brake must be in-line with the rotational centre of the barrier (i.e. the central axis of the shaft to which the barrier is attached), it is necessary to strike a compromise between the dimensions of the brake (in particular, the diameter of the brake) and the available braking torque, where conventional electromechanical shaft brakes are used.

Within such electromechanical shaft brakes, it is also necessary to ensure that the components are correctly aligned, since poor alignment will be detrimental to brake performance. It is also necessary to set the working gap of the brake (i.e. the operational clearance between the engaging surfaces of the armature and electromagnet body) to be sufficiently small to ensure the armature engages with the electromagnet body, which can be complicated to achieve and may require adjustment in different settings and applications. Similarly, it is necessary to configure the armature to be able to move across the working gap to engage with the electromagnet body. Again, configuring the brake in such a manner is complicated and may require the use of additional components such as flexible spring plates or splines, which must be mechanically substantial to bear the torque load. This adds to the cost of brake components and failure of any one of such additional components could cause the brake to fail.

In order to achieve a high braking torque, the brake structure, in particular the moving components, must be mechanically substantial. Metal components are therefore used. This has an undesirable effect in terms of the noise produced when operated i.e. the mechanical 'snap' noise associated with substantial components moving relative to each other and being brought into and out of contact with each other, in particular the armature and electromagnet body.

A further problem associated with known systems is that a very powerful electromagnet is required in order to provide a magnetic force sufficient to produce the necessary braking torque, since the achievable braking torque is dependent upon the pull of the electromagnet poles on the armature. This has an undesirable effect on 'standby' power consumption and heat generated because the product may spend most of the time in the locked condition.

SUMMARY

The present invention arose out of a need to provide an access control system which provides a high braking force to the barrier to prevent forced opening of the barrier, whilst minimising the footprint and space envelope of the brake component. The present invention also seeks to provide an access control system which has quieter operation, lower power consumption, higher braking torque and easy setting and adjustment of the brake gap.

According to the present invention there is provided an access control system for restricting access through a passageway, the access control system comprising:
 a shaft which is rotatable about a central axis;
 a barrier fixed to the shaft to rotate therewith; and
 a brake assembly for applying a braking force to the shaft, wherein the brake assembly comprises:
 a sun gear which is rotatable about the central axis of the shaft;

a carrier and a ring gear, wherein one of the carrier or the ring gear is fixed against rotation and wherein the other of the carrier or ring gear is connected to the shaft to rotate therewith;

a plurality of planet gears rotatably connected to the carrier so as to permit rotation relative to the carrier, preferably about an axis parallel to the central axis of the shaft, each planet gear being disposed between the sun gear and the ring gear and engaging with each of the sun gear and the ring gear; and an electromagnetic brake comprising an electromagnet and an armature, the armature being connected to or integral with the sun gear to rotate therewith, wherein at least one of the electromagnet or the armature is moveable upon energisation of the electromagnet between an operative position in which the electromagnet and the armature are in contact, such that the electromagnetic brake provides a braking force to the sun gear, and an inoperative position in which the electromagnet is spaced from the armature, such that the electromagnetic brake provides no braking force to the sun gear.

With the arrangement of the present invention, rotation of the shaft causes rotation of the sun gear via the carrier and ring gear, one of which is permanently fixed against rotation, and the planet gears. The arrangement of the gear train in the brake assembly is such that the sun gear rotates at a speed greater than the shaft. Conversely, the torque of the sun gear is reduced relative to the torque of the shaft by the same ratio. Accordingly, the braking force required to prevent rotation of the sun gear, and therefore the shaft, is significantly reduced.

When the electromagnet or the armature is in the inoperative position, the armature and sun gear are permitted to rotate freely relative to the electromagnet. When the armature is brought into contact with the electromagnet by moving either the electromagnet or the armature into the operative position, a braking force is directly or indirectly applied to the sun gear. The magnitude of the braking force required to prevent rotation of the armature and sun gear, and therefore the shaft, is relatively small compared to conventional electromechanical shaft brakes, due to the arrangement of the gears. The effective braking force of the brake assembly is therefore significantly increased compared to a conventional electromagnetic shaft brake formed of the same materials and having the same armature diameter and magnetising force. The effective braking force is therefore increased, without the need to increase the diameter of the armature, thus permitting the dimensions of the brake to be minimised. At the same time, it is also possible to use a less powerful electromagnet than conventional electromechanical shaft brakes, since the required braking force is lower. This reduces the power consumption of the access control system.

The advantageous effect of the present invention can be achieved by fixing either the carrier or the ring gear against rotation, with the other of the carrier or the ring gear being directly or indirectly fixed to the shaft to rotate with the shaft. The component fixed against rotation may be so fixed by means of a bracket or other fixing member arranged to fix said component to any stationary object, such as a housing of the access control system or the ground, for example. The component fixed to the shaft may be so fixed by any appropriate means which ensures that said component rotates with the shaft, including but not limited to forming said component integrally with the shaft.

In a preferred embodiment, the ring gear is fixed against rotation and the carrier is fixed to the shaft to rotate with the shaft. In an alternative embodiment, the ring gear is fixed to the shaft to rotate therewith and the carrier is fixed against rotation.

It will be appreciated that the gear ratio of the brake assembly (i.e. between the shaft as input, via the carrier or ring gear, and the sun gear as output) will be determined by the relative dimensions of the ring gear and the sun gear and the number of teeth thereof. This in turn determines the speed and torque of the rotating sun gear and, therefore, the braking force required to prevent such rotation. The smaller the sun gear relative to the ring gear, the greater the speed of rotation of the sun gear, the lower its torque and, therefore, the lower the braking force required to prevent rotation of the sun gear. However, this must be balanced with the need to ensure that the dimensions of the sun gear are sufficient to bear the torque load. It has been found that a gear ratio between the shaft and the sun gear in the range 1:2 to 1:3 is particularly effective in a brake assembly dimensioned appropriately for a typical access control system. In some preferred embodiments, the gear ratio is in the range 1:2.6 to 1:2.7. In a particularly preferred embodiment, the gear ratio is approximately 1:2.67.

A further advantage of the present invention is the inherent spline effect provided by the teeth of the sun gear when engaged with the teeth of the planet gears. This spline effect permits the sun gear to move in an axial direction of the shaft and thus permits the position of the sun gear to be easily set and/or adjusted in order to provide the optimal operational clearance between the armature and any surface of the electromagnet with which the armature engages to apply a braking force to the sun gear. The sun gear can be moved independently of the planet gears and ring gear, meaning that these components can be in a fixed position whilst permitting the position of the sun gear to be adjusted.

Preferably, the sun gear is centred on the shaft and is rotatable relative to the shaft. The sun gear is preferably moveable relative to the shaft in an axial direction of the shaft. Accordingly, the position of the sun gear can be adjusted independently of the position of the shaft, meaning that the operational clearance between the armature and any surface of the electromagnet with which the armature engages to apply a braking force to the sun gear can be easily set and/or adjusted. Additionally, the inherent spline effect between the sun gear and each of the planet gears permits axial movement of the sun gear relative to the planet gears and the shaft. This axial movement of the sun gear can be used to provide the necessary degree of freedom to the armature to alternate between the operative and inoperative positions without the need for a spring member, such as a disc spring, to be positioned between the armature and the sun gear (i.e. to permit axial movement of the armature relative to the sun gear). Accordingly, the armature can be formed integrally with the sun gear, or attached to the sun gear by any appropriate means, and is moveable with the sun gear in an axial direction of the shaft in order to alternate between the operative and inoperative positions. The brake assembly may therefore comprise a spring or other biasing means arranged to bias the armature into the inoperative position together with the sun gear.

The brake assembly is arranged such that the armature is moved into the operative position when the electromagnet is energised. With this arrangement, the brake is made 'fail-safe', such that in the event of a power failure the brake is deactivated i.e. the armature moves into the inoperative position, allowing free rotation of the sun gear and, consequently, the shaft and barrier.

The electromagnet may comprise a surface which acts as a friction member, and with which a corresponding surface of the armature engages when the electromagnet or the armature is in the operative position. Alternatively, a separate friction member may be connected to the electromagnet, which is brought into contact with armature when either the electromagnet or the armature is moved into the operative position. One or both of the mutually engaging surfaces of the armature and the electromagnet may be shaped so as to increase the coefficient of friction of that surface and/or comprise a material with a high coefficient of friction.

A spring member may be positioned between the armature and the sun gear. Preferably, the spring member is arranged to bias the armature into the inoperative position, such that the armature moves into the operative position when the electromagnet is energised, against the bias of the spring member. Therefore, to apply a braking force to the shaft, the electromagnetic must be energised. Conversely, the brake is released by de-energising the electromagnet. Advantageously, this provides a fail-safe arrangement of the brake assembly.

The spring member may preferably be a disc spring or spring plate.

A bearing may be located in a body of the electromagnetic brake and holding the shaft.

Any appropriate means may be provided for driving the shaft so as to open or close the barrier. The access control system preferably comprises a motor arranged to drive the shaft, either directly or indirectly. In one embodiment, the carrier is fixed to or integral with a pulley wheel, the pulley wheel being connected to the motor so as to transmit rotational motion of the motor to the shaft. The rotational motion of the motor is preferably transferred by means of a belt connecting an output of the motor to the pulley wheel. Preferably, the pulley wheel is used as the carrier of the brake assembly.

Preferably, the access control system comprises at least four planet gears, more preferably at least six planet gears, and most preferably at least eight planet gears. Accordingly, the braking force is shared between at least four, preferably at least six and most preferably at least eight sets of teeth. This reduces the load on each individual set of teeth when the shaft is rotated and thereby improves the durability of the brake assembly.

In some preferred embodiments, one or more of the sun gear, ring gear and planet gears is formed of a plastic material. In a particularly advantageous embodiment, each of the sun gear, ring gear and planet gears is formed of a plastic material. Each of the components of the gear train only experiences significant forces when the brake is energised and the barrier is forced. The gear train or components thereof can therefore be made of relatively inexpensive materials such as plastic. This provides the further advantage of reducing the mass of the components, thus reducing the noise generated when the shaft rotates and or the brake assembly is activated/deactivated. The use of a plastics material for one or more components of the gear train is made possible by the unique arrangement of the brake assembly, which reduces the braking force required to prevent rotation of the shaft, as described above.

The electromagnet may preferably be shock mounted, thus further reducing the noise generated when the brake assembly is activated/deactivated. This arrangement is possible due to the reduced torque required to apply a braking force to the rotating sun gear.

Preferably, the access control system further comprises a control unit configured to control the movement of the armature between the operative and inoperative positons. Advantageously, the control unit is programmed to receive a signal providing an instruction to move the barrier, control the electromagnetic brake to move the armature into the inoperative position, in response to receipt of said signal, and control the shaft to rotate once the armature has been moved into the inoperative position.

The access control system may additionally comprise an authorisation unit configured to generate said signal providing an instruction to move the barrier. For example, the access control system may comprise an identification card reader which is configured to generate said signal upon presentation of an authorised identification card. Alternative or additional authorisation means may be provided, such as facial recognition systems or keypads, for example. The authorisation unit may be configured to generate said signal upon instruction by a user, such as a porter or guard.

The access control system may comprise a sensor for detecting movement of the barrier or pressure applied to the barrier when the armature is in the operative position. The access control system may comprise a motion sensor and/or a pressure sensor. It is thereby possible to detect if a barrier is being forced, which may be particularly useful in an environment in which a large number of access control systems are provided to control access through a correspondingly large number of passageways, for example at the entrance to a train station. This enables the access control system to provide a signal indicating the barrier is being forced, which signal can be used to provide a warning to an operator or user than a forced entry or exit is being attempted. An alarm may additionally be provided, with the control unit being programmed to activate the alarm in response to the detection of movement of the barrier and/or pressure applied to the barrier when the armature is in the operative position. The alarm may be visual, such as a warning light, and/or audial, such as a siren.

DESCRIPTION OF THE DRAWINGS

Non-limiting embodiments of the invention will now be described, by way of example only, with reference to the accompanying drawings in which.

DETAILED DESCRIPTION

Figure 1A:
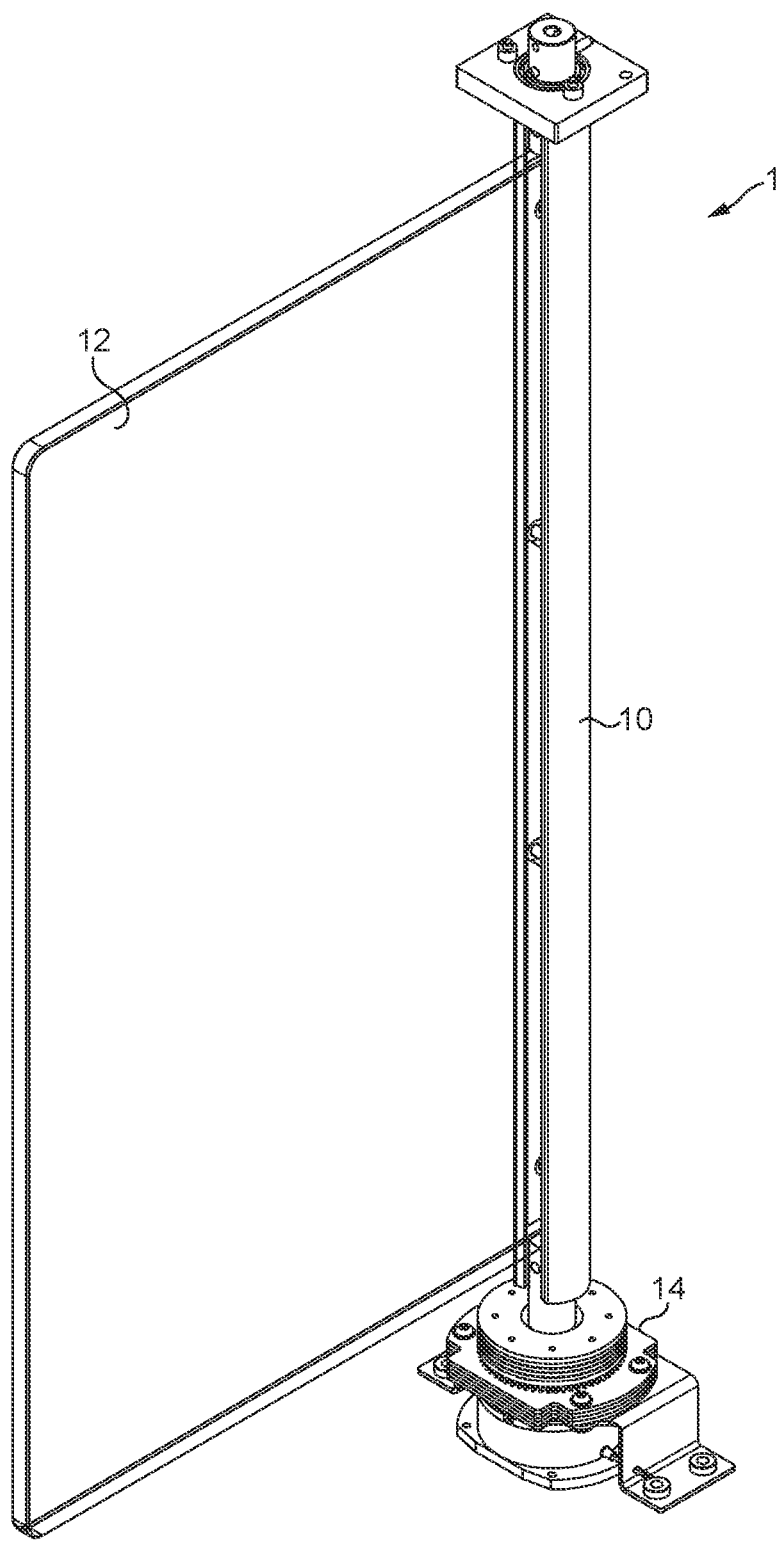
FIG. 1A is a perspective view of an access control system in accordance with the present invention.
Figure 1B:
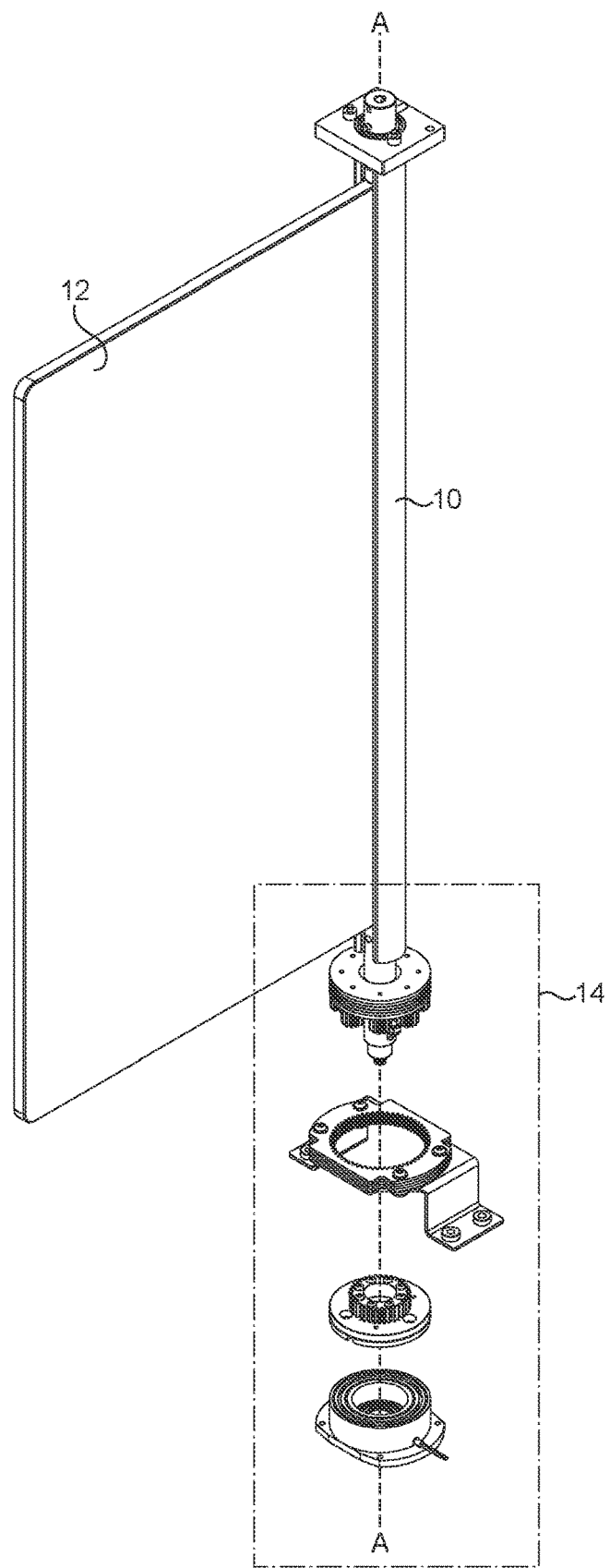
FIG. 1B shows the access control system of FIG. 1, with the brake assembly in exploded view.

With reference to FIGS. 1A and 1B, there is shown an access control system 1, comprising a shaft 10, which is rotatable about a central axis A, and a barrier 12 fixed to the shaft 10 to rotate therewith. In use, the barrier 12 is arranged to extend across a passageway to restrict access through the passageway. In order to permit access through the passageway, the shaft 10 is rotated causing the barrier 12 to move out of the passageway. The passageway may be any entry portal or gate through which a person must pass to enter a building or any other restricted area. Typically, persons requiring access through the passageway must be authorised, with the authorisation process either being automated, for example by means of an identification card reader or facial recognition system, or may be manually operated by a user, such as a porter or guard, upon presentation of appropriate authorisation.

In order to prevent the barrier 12 from being forced open, for example by a person pushing the barrier 12, a brake assembly 14 is provided, which, when active, applies a braking force to the shaft 10 thus preventing the barrier 12 from being moved. FIG. 1B shows the access control system 1 with the components of the brake assembly 14 in exploded view.

Figure 2:
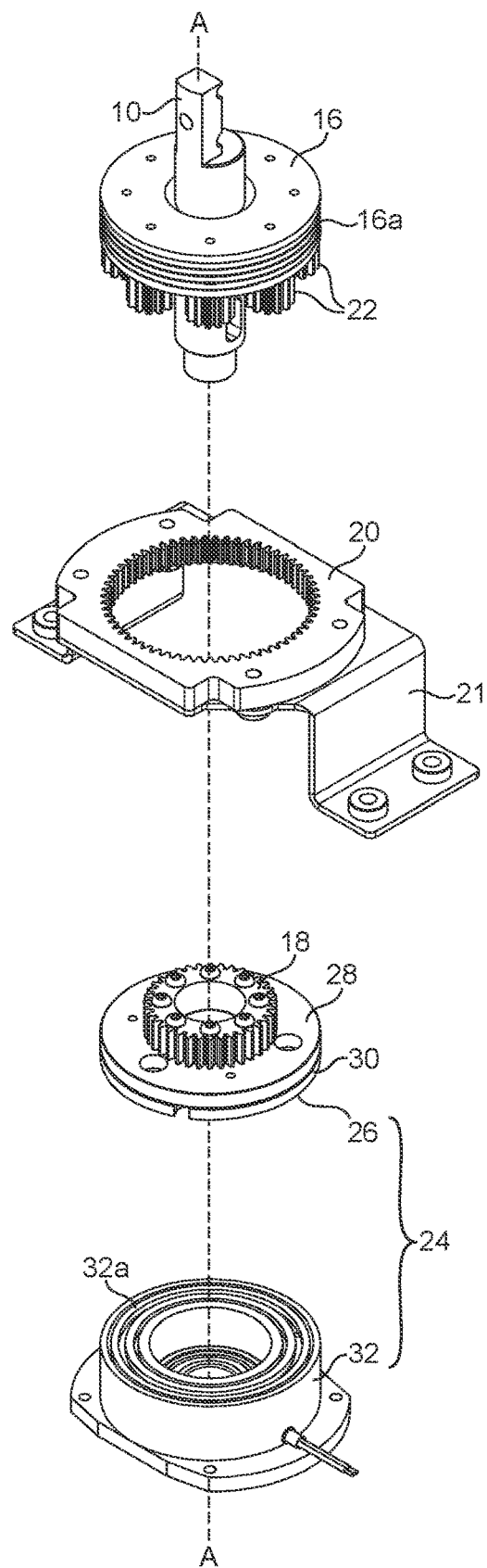
FIG. 2 is enlarged view of the exploded brake assembly of FIG. 1B.
Figure 3:
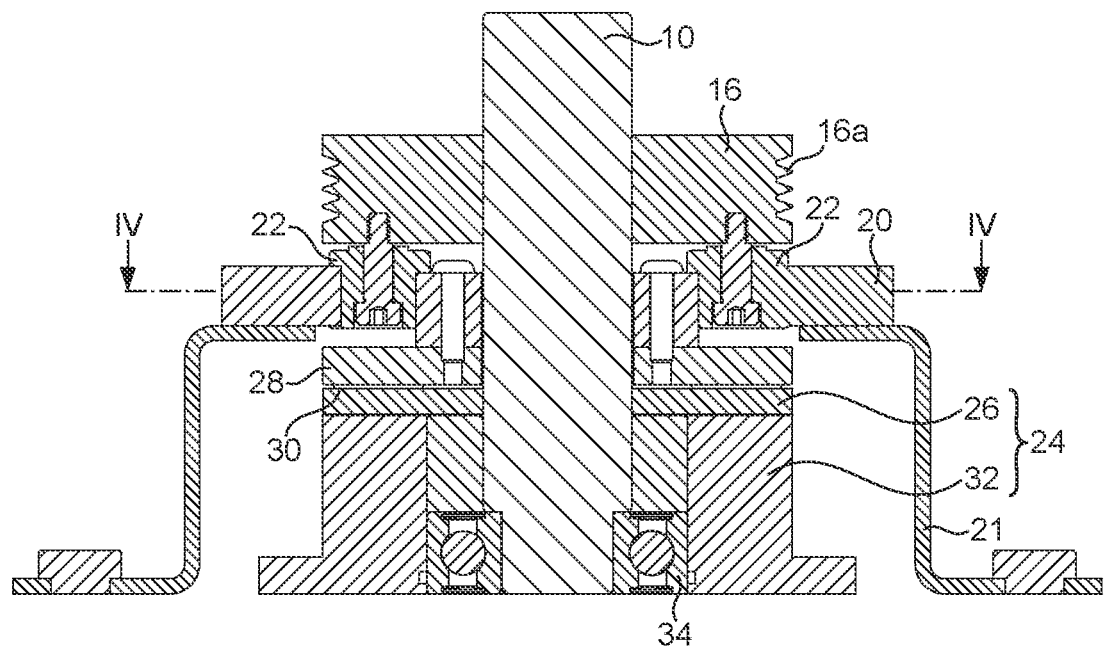
FIG. 3 is a vertical cross section of the brake assembly.

The brake assembly 14 is shown in more detail in FIGS. 2 and 3. The brake assembly 14 comprises a carrier 16 fixed to the shaft 10 such that the carrier 16 rotates with the shaft 10, and vice versa. Accordingly, in some embodiments such as that shown in FIG. 2, the carrier 16 is a pulley wheel having an outer circumferential surface 16a arranged to engage with a belt (not shown) for transferring rotational motion of a motor (not shown) to the carrier 16 and, therefore, also to the shaft 10. Accordingly, the shaft 10 is driven by the motor via the carrier 16. Alternative embodiments may comprise other means for driving the shaft 10.

The brake assembly 14 further comprises a planetary gear train including a sun gear 18 arranged coaxially with the shaft 10 and rotatable about the central axis A of the shaft 10 and a ring gear 20 which is fixed against rotation by means of mounting bracket 21, which can be secured to a frame or surround of the access control system, or any other appropriate fixed structure. A plurality of planet gears 22 are rotatably connected to the carrier 16 so as to permit rotation of each planet gear 22 relative to the carrier 16 about an axis parallel to the central axis A of the shaft 10.

Figure 4:
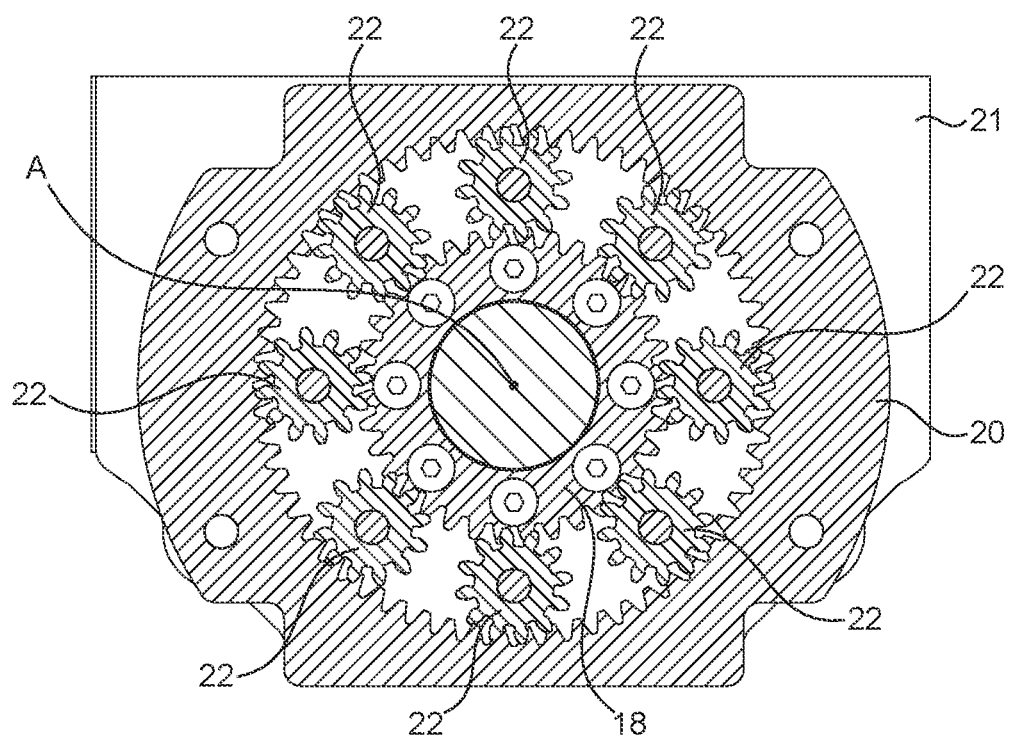
FIG. 4 is a horizontal cross section of the brake assembly through line Iv-Iv shown in FIG. 3.

As shown most clearly in FIG. 4, each planet gear 22 is disposed between the sun gear 18 and the ring gear 20 and engages with each of the sun gear 18 and the ring gear 20 via the teeth thereof. In use, the planet gears 22 are driven between the fixed ring gear 20 and rotatable sun gear 18 when the shaft 10 and carrier 16 are rotated. Rotation of the shaft 10 and carrier 16 is therefore transferred to the sun gear 18 via the planet gears 22, with the sun gear 18 rotating at a greater speed than the shaft 10.

Referring again to FIGS. 2 and 3, an electromagnetic brake 24 comprising an armature 26 is provided to apply a braking force to the sun gear 18. In the illustrated embodiment, the armature 26 of the electromagnetic brake 24 is connected to the sun gear 18 via an adaptor plate 28 and a disc spring or spring plate 30 such that the armature 26 rotates with the sun gear 18. The disc spring or spring plate 30 is arranged to bias the armature to an inoperative position, that is, a position in which there is an operation clearance between the armature 26 and a friction surface 32a of an electromagnet 32. The friction surface 32a is therefore a friction member which is fixed against rotation. This operational clearance permits free rotation of the armature 26, and thus the sun gear 18, relative to the electromagnet 32, which is fixed against rotation. This position of the armature 26 is referred to as the inoperative position i.e. there is no braking force applied to the sun gear 18 by the armature 26.

The armature 26 is magnetic. When the electromagnet 32 is energised, the armature 26 is pulled under electromagnetic attraction toward the electromagnet 32, which includes an electromagnetic coil (not shown). This movement of the armature is permitted by the disc spring or spring plate 30. The biasing force of the disc spring or spring plate 30 towards the sun gear 18 and adaptor plate 28 is overcome by the electromagnetic attraction towards the electromagnet 32, such that the armature 26 is brought into frictional contact with the friction surface 32a against the bias of the disc spring or spring plate 30. Accordingly, a braking force is applied to the armature 26 by means of the frictional contact between the armature 26 and the friction surface 32a, and the magnetic force pulling the armature 26 towards the electromagnet 32. The armature 26, in turn, provides a braking force to the sun gear 18 via the disc spring or spring plate 30 and adaptor plate 28. This position of the armature 26 is referred to as the operative position i.e. the armature 26 is brought into contact with the electromagnet 32 such that a braking force is applied to the sun gear 18 by the armature 26. In the above arrangement, the brake is actuated by energising the electromagnet 32 (a so-called "power-on" electromagnetic brake), meaning that in the event of a power failure the electromagnetic brake 32 will release permitting the barrier to be opened (i.e. the access control system is "fail-safe").

The arrangement described above is preferred due to its uncomplicated construction and the strong braking force which it provides, whilst ensuring that the access control system remains fail-safe. However, it will be appreciated that other arrangements would be conceivable to the skilled person, in which an armature and an electromagnet are relatively movable between an operative position in which the armature is in contact with the electromagnet to provide a braking force to the sun gear, and an inoperative position in which the armature is spaced from the electromagnet, such that the armature provides no braking force to the sun gear. For example, the electromagnet may be fixed against rotation but permitted to move axially upon energisation of the electromagnet so as to make contact with the armature and apply a braking force to the sun gear. Further alternative arrangements of the brake assembly will be conceivable to the skilled person, without deviating from the scope of the present invention.

Referring again to the embodiment shown in FIG. 3, a shaft bearing 34 is housed within the body of the electromagnet 32. The sun gear 18 is centred on the shaft 10 and is rotatable relative to (i.e. around the shaft). Accordingly, rotational movement of the shaft 10 is not transferred directly to the sun gear 18 or vice versa (such rotational movement only being transferred by means of the planetary gear train, as described above). The sun gear 18 rotates at a greater speed than the shaft 10 at a speed ratio corresponding to the gear ratio of the planetary gear train.

The gear ratio of a planetary gear train is dependent upon the number of teeth of the sun gear and the ring gear. Where the ring gear is fixed against rotation, the gear ratio can be determined according to the equation:

$$R=1/(1+N_R/N_s)$$

where R is the gear ratio, $N_R$ is the number of teeth of the ring gear and $N_s$ is the number of teeth of the sun gear.

In the illustrated embodiment, the gear train comprises a ring gear having 60 teeth, a sun gear having 36 teeth and eight planet gears each having 12 teeth. Therefore, this arrangement provides a gear ratio of 1:2.67. Accordingly, the sun gear 18 rotates 2.67 times faster than the shaft 10.

The torque of the sun gear 18 is reduced by the same ratio, relative to the torque of the rotating shaft 10. Accordingly, the braking force required to prevent rotation of the sun gear 18 at a given torque is significantly reduced. A person attempting to force the barrier 12 open will apply a force to the barrier 12 at a given perpendicular distance from the central axis A of the shaft 10, which results in a potentially very large torque being generated about the central axis A of the shaft 10. If a person attempts to force the barrier 12 open when the brake is actuated (i.e. the electromagnet 32 is energised and the armature 26 is in the operative position), the necessary braking force that must be applied to the to the sun gear 18 in order to withstand this potentially very large torque applied to the shaft 10 is greatly reduced. This means that the overall dimensions of the electromagnetic brake (in particular, the surface area of the engaging surfaces of the armature 26 and electromagnet 32) can be minimised, as can the required strength of the magnetic field induced by the electromagnet 32. Thus, not only can the brake be reduced in size, the power consumption of the electromagnetic brake can also be reduced.

Due to the spline effect of the gears, the sun gear 18 is able to move relative to the shaft 10, the ring gear 20 and the planet gears 22 in an axial direction of the shaft 10 (vertically as shown in FIG. 3). Accordingly, the working gap of the electromagnetic brake 24 (i.e. the operational clearance between the engaging surfaces of the armature 26 and the electromagnet 32) can be adjusted independently of the position of the shaft 10. This allows easy and reliable optimisation of the brake gap. This may be achieved, by way of example, using simple sprung components (not shown). The armature 26 can thus be easily positioned so that it is clear of the friction surface 32a of the electromagnet 32 when the electromagnet 32 is de-energised, but also such that the operational clearance is sufficiently small to ensure that the armature 26 moves to engage with the friction surface 32a when the electromagnet 32 is energised.

Figure 5:
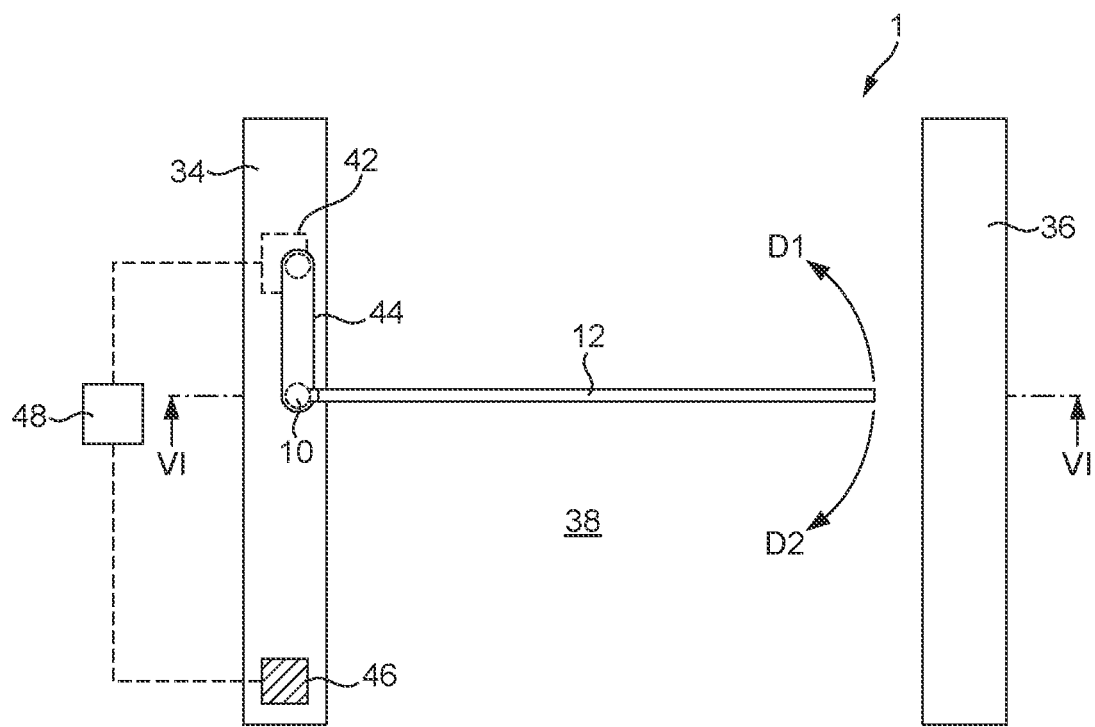
FIG. 5 is a plan view of an access control system according to the present invention.
Figure 6:
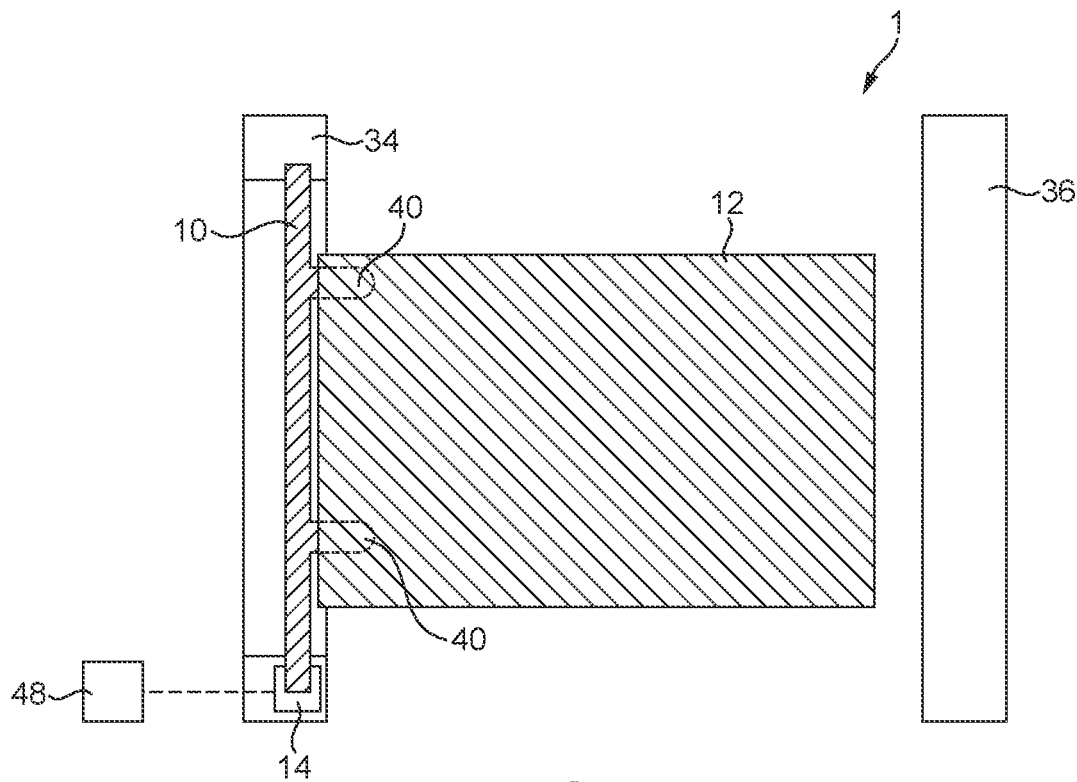
FIG. 6 is a cross-section of the access control system of FIG. 5 through line VI-VI indicated in FIG. 6.

With reference to FIGS. 5 and 6, there is shown a further embodiment of an access control system 1 in accordance with the present invention, with corresponding features being indicated with like numerals. The access control system 1 comprises two walls 34, 36 defining a passageway 38 between them. The barrier 12 extends across the passageway 38 from one of the walls 34, substantially perpendicularly to said wall 34. Alternative embodiments of the present invention may comprise two or more barriers, with at least one barrier extending across the passageway from each of the walls. The barrier 12 is attached to the shaft 10, which is rotatably mounted within the wall 34, such that the barrier 12 is capable of movement within the passageway in a first direction D1 and a second direction D2.

FIG. 6 shows a schematic cross section of the access control system 1 through line VI-VI indicated in FIG. 5. The barrier 12 is attached to the shaft 10 by means of brackets 40. The access control system 1 comprises a brake assembly 14 as described in detail above. A motor 42 is provided for controlling the rotation of the shaft 10 via a pulley belt 44. The pulley belt 44 may be connected to the carrier 16 of the brake assembly 14, as described above, or may alternatively be connected to any other component in a manner which enables the motor 42 to drive the shaft 10. In alternative embodiments the shaft 10 may be driven directly by a motor.

The access control system 1 comprises an authorisation unit 46 in the form of an identity card reader positioned on the upper surface of the wall 34. Alternative embodiments may comprise any appropriate means for authorising access through the passageway, such that the passage of people through the passageway is permitted only for authorised persons. The means may be automatic (for example, a facial recognition system), permitting passage of an authorised person without the need for interaction by any other person, or may be controlled by, for example, a porter guard who authorises access manually. Multiple means for authorising access may be provided.

The access control system 1 further comprises a control unit 48 which is electronically connected to each of the brake assembly 14, the motor 42 and the identity card reader 46. Whilst the control unit 48 is shown externally of the wall 34, it will be appreciated that the control unit 48 may be housed within the wall 34 together with the other components of the access control system 1.

An exemplary procedure for controlling access through the passageway will now be described. At first, the access control system 1 is configured such that the barrier 12 extends across the passageway 38 so as to prevent a person passing through the passageway 38 without first opening the barrier 12. The brake assembly 14 is configured such that the armature 26 is in the operative position as described above, such that the brake assembly 14 is in an actuated state. Accordingly, in the operative state, if a person attempts to push or pull the barrier 12 open in either direction D1 or D2, the braking force applied to the sun gear 18 of the brake assembly 14 by the armature prevents the shaft 10 from rotational movement and thus prevents the barrier 12 from being opened.

In order to gain access, an authorised person presents an identity card to the identity card reader 46, which transmits information relating to the owner of the identity card to the control unit 48. The control unit 48 processes said information in order to determine whether or not the owner of the identity card is an authorised person and, if so, send a signal to the brake assembly 14 to move the armature 26 from the operative position to the inoperative position. Accordingly, the braking force to the sun gear 18 is released and the sun gear 18 and shaft 10 are free to rotate. The control unit 48 also sends a signal to the motor 42 to drive the shaft 10 such that the barrier 12 opens, allowing access through the passageway 38. The control unit 48 is further configured the send a signal to the motor 42 to drive the shaft 10 so as to close the barrier 12, either after a predetermined time period, or alternatively once it has been determined that the authorised person has passed through the passageway 38, for example using additional sensors configured to detect the presence of a person within the passageway 38.

The invention has been described above with reference to specific embodiments, given by way of example only. It will be appreciated that different arrangements of the system are possible, which fall within the scope of the appended claims.

What is claimed is:

1. An access control system for restricting access through a passageway, the access control system comprising:
   a shaft which is rotatable about a central axis thereof,
   a barrier fixed to the shaft to rotate therewith, and
   a brake assembly for applying a braking force to the shaft, wherein the brake assembly comprises:
      a sun gear which is rotatable about the central axis of the shaft;
      a carrier and a ring gear, wherein one of the carrier or the ring gear is fixed against rotation such that the one of the carrier or the ring gear is not rotatable with the shaft, and wherein the other of the carrier or the ring gear is connected to the shaft to rotate therewith;
      a plurality of planet gears rotatably connected to the carrier so as to permit rotation of the planet gears relative to the carrier, the planet gears being disposed between the sun gear and the ring gear and engaging with each of the sun gear and the ring gear; and an electromagnetic brake comprising an electromagnet and an armature, the armature being connected to or integral with the sun gear to rotate therewith, wherein energization of the electromagnet moves the armature from an inoperative position in which the electromagnet is spaced from the armature, into an operative position in which the electromagnet and the armature are in contact, wherein the sun gear is centered on the central axis of the shaft and is rotatable relative to the shaft, and wherein the sun gear is moveable relative to the shaft in an axial direction of the shaft in response to the energization of the electromagnet of the electromagnetic brake.

2. The access control system as claimed in claim 1, wherein the electromagnet is fixed against movement in the axial direction of the shaft and wherein the armature is biased toward the inoperative position.

3. The access control system as claimed in claim 1, further comprising a bearing located in a body of the electromagnet and supporting the shaft.

4. The access control system as claimed in claim 1, further comprising a motor for driving the shaft.

5. The access control system as claimed in claim 4, wherein the carrier is fixed to or integral with a pulley wheel, the pulley wheel being connected to the motor so as to transmit rotational motion of the motor to the shaft.

6. The access control system as claimed in claim 1, wherein the plurality of planet gears includes at least eight planet gears.

7. The access control system as claimed in claim 1, wherein one or more of the sun gear, ring gear and planet gears is formed of a plastic material.

8. The access control system as claimed in claim 1, further comprising a control unit configured to control the movement of the armature between the operative and inoperative positions.

9. The access control system as claimed in claim 8, wherein the control unit is programmed to:
receive a signal providing an instruction to move the barrier;
control the electromagnetic brake to move the armature into the inoperative position, in response to receipt of said signal; and
rotate the shaft once the armature has been moved into the inoperative position.

10. The access control system as claimed in claim 9, further comprising an authorisation unit configured to generate said signal providing said instruction to move the barrier.

11. The access control system as claimed in claim 10, wherein the authorisation unit is an identification card reader.

12. The access control system as claimed in claim 8, further comprising a sensor for detecting movement of the barrier or pressure applied to the barrier when the armature is in the operative position.

13. The access control system as claimed in claim 12, further comprising an alarm, wherein the control unit is programmed to activate the alarm in response to the detection of movement of the barrier, pressure applied to the barrier, or both when the armature is in the operative position.

* * * * *